(12) United States Patent
Srinivasan et al.

(10) Patent No.: US 10,037,593 B2
(45) Date of Patent: Jul. 31, 2018

(54) DYNAMIC IMAGE PRESENTATION

(71) Applicant: Microsoft Technology Licensing, LLC, Redmond, WA (US)

(72) Inventors: Sridhar Srinivasan, Shanghai (CN); Rui Zhu, Redmond, WA (US); Justin Samuel Denney, Shanghai (CN)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 105 days.

(21) Appl. No.: 15/169,705

(22) Filed: May 31, 2016

(65) Prior Publication Data

US 2016/0275647 A1   Sep. 22, 2016
US 2018/0075577 A9   Mar. 15, 2018

Related U.S. Application Data

(63) Continuation of application No. 12/770,988, filed on Apr. 30, 2010, now Pat. No. 9,383,916.
(Continued)

(51) Int. Cl.
*G06F 3/0484*   (2013.01)
*G06F 3/0485*   (2013.01)
(Continued)

(52) U.S. Cl.
CPC .............. *G06T 3/40* (2013.01); *G06F 3/0485* (2013.01); *G06F 3/0488* (2013.01); *G06F 3/04845* (2013.01); *G06T 2200/24* (2013.01)

(58) Field of Classification Search
None
See application file for complete search history.

(56) References Cited

U.S. PATENT DOCUMENTS 6,850,247 B1   2/2005   Reid et al.
7,391,423 B1   6/2008   Manzari et al.
(Continued)

FOREIGN PATENT DOCUMENTS

CN   1489751 A    4/2004
EP   0929184 A2   7/1999
(Continued)

OTHER PUBLICATIONS

"Apple—Aperture 2: 100 + New Features", Retrieved from <<http://web.archive.org/web/20081010131832/http://www.apple.com/aperture/features/100.html>>, Retrieved on Oct. 12, 2009, 5 Pages.
(Continued)

*Primary Examiner* — Yingchun He
(74) *Attorney, Agent, or Firm* — Alleman Hall Creasman & Tuttle LLP

(57) ABSTRACT

One or more techniques and/or systems are disclosed for efficiently organizing images in a display. A size of an image is scaled by an image scale factor, while an aspect ratio for the image is maintained, where the image scale factor comprises a combination of a first scale distance and a second scale distance. The scaled image is filled into a first display line, if the size of the scaled image is not greater than an amount of display space remaining in the first display line; otherwise the scaled image is filled into a second display line. The image is expanded to mitigate white space in the display after the scaling, while maintaining the image's aspect ratio. This can be performed for a collection of images presented on a display to provide an enhanced user experience.

20 Claims, 13 Drawing Sheets

Related U.S. Application Data

(60) Provisional application No. 61/247,456, filed on Sep. 30, 2009.

(51) Int. Cl.
*G06F 3/0488* (2013.01)
*G06T 3/40* (2006.01)

(56) References Cited

U.S. PATENT DOCUMENTS

| | | |
|---|---|---|
| 7,536,654 B2 | 5/2009 | Anthony et al. |
| 2002/0095439 A1 | 7/2002 | Long et al. |
| 2002/0105531 A1 | 8/2002 | Niemi |
| 2002/0126149 A1 | 9/2002 | Umeda |
| 2003/0080977 A1 | 5/2003 | Scott et al. |
| 2004/0145593 A1 | 7/2004 | Berkner et al. |
| 2004/0179026 A1 | 9/2004 | Rix |
| 2004/0179826 A1 | 9/2004 | Kim et al. |
| 2005/0091599 A1 | 4/2005 | Yamakado et al. |
| 2005/0210414 A1 | 9/2005 | Angiulo et al. |
| 2006/0026535 A1 | 2/2006 | Hotelling et al. |
| 2006/0168542 A1 | 7/2006 | Abanami et al. |
| 2006/0214953 A1 | 9/2006 | Crew et al. |
| 2007/0074110 A1 | 3/2007 | Miksovsky et al. |
| 2007/0101299 A1 | 5/2007 | Shaw et al. |
| 2007/0152984 A1 | 7/2007 | Ording et al. |
| 2008/0052945 A1 | 3/2008 | Matas et al. |
| 2008/0111841 A1 | 5/2008 | LeMay et al. |
| 2009/0141046 A1 | 6/2009 | Rathnam et al. |
| 2009/0198359 A1 | 8/2009 | Chaudhri |
| 2010/0245600 A1 | 9/2010 | Chang et al. |

FOREIGN PATENT DOCUMENTS

| | | |
|---|---|---|
| JP | H10293857 A | 11/1998 |
| JP | H10340330 A | 12/1998 |
| JP | H11250272 A | 9/1999 |
| JP | 2000138814 A | 5/2000 |
| JP | 2002132406 A | 5/2002 |
| JP | 2002158861 A | 5/2002 |
| JP | 2002288669 A | 10/2002 |
| JP | 2003532205 A | 10/2003 |
| JP | 2005079817 A | 3/2005 |
| JP | 2005217802 A | 8/2005 |
| JP | 2005222311 A | 8/2005 |
| JP | 2006024183 A | 1/2006 |
| JP | 2006244051 A | 9/2006 |
| JP | 2008158676 A | 7/2008 |
| JP | 2008299474 A | 12/2008 |
| JP | 2009245037 A | 10/2009 |
| RU | 2242043 C2 | 12/2004 |
| WO | 0182231 A2 | 11/2001 |
| WO | 03015032 A1 | 2/2003 |
| WO | 2008136151 A1 | 11/2008 |

OTHER PUBLICATIONS

"Apple iPod Touch 32GB (2nd Generation)", Retrieved from <>http://web.archive.org/web/20090415213104/http://www.easylifeing.com/productinfo.asp?id=196>>, Retrieved on Oct. 12, 2009, 7 Pages.
"Apple MacBook Air", Available at: <<https://www.youtube.com/watch?v=a5f02GN4OhA>>, Apr. 4, 2008, 1 Page.
"Applied Calculus", Retrieved from <<http://web.archive.org/web/20080829151503/http://www.zweigmedia.com/ RealWorld/Calcsumm2.html>>, Aug. 29, 2008, 5 Pages.
"EyePhoto 1.11", Retrieved from <<http://download.cnet.com/EyePhoto/3000-2192_4-10947134.html>>, Retrieved on Oct. 12, 2009, 6 Pages.
"Where all Your Pictures be in your iPhone? I Having Fun with Your iPhone", Retrieved from <<http://www.bench3.com/2009/07/where-all-your-pictures-be-in-your.html>>, Jul. 11, 2009, 5 Pages.
"Notice of Allowance Issued in Korean Patent Application No. 10-2012-7008408", dated Aug. 23, 2016, 3 Pages. (W/o English Translation).
"Office Action Issued in Korean Patent Application No. 10-2012-7008408", dated Feb. 12, 2016, 4 Pages.
"Communication Issued in European Patent Application No. 10821024.6", dated Feb. 20, 2014, 1 Page.
"Reply to Communication Filed in European Patent Application No. 10821024.6", Filed Date: Aug. 20, 2014, 18 Pages.
"Supplementary Search Report Issued in European Patent Application No. 10821024.6", dated Feb. 3, 2014, 10 Pages.
Bache-Wiig, Jens, "Using Multi-Touch and Gestures with QT", In White Paper of Nokia, Oct. 9, 2009, 52 Pages.
"Final Office Action Issued in U.S. Appl. No. 12/770,988", dated Jun. 21, 2013, 20 Pages.
"Final Office Action Issued in U.S. Appl. No. 12/770,988", dated Apr. 21, 2015, 29 Pages.
"Final Office Action Issued in U.S. Appl. No. 12/770,988", dated Aug. 11, 2014, 20 Pages.
"Non Final Office Action Issued in U.S. Appl. No. 12/770,988", dated Dec. 10, 2014, 25 Pages.
"Non Final Office Action Issued in U.S. Appl. No. 12/770,988", dated Apr. 11, 2014, 19 Pages.
"Non Final Office Action Issued in U.S. Appl. No. 12/770,988", dated Feb. 22, 2013, 21 Pages.
"International Preliminary Report on Patentability Issued in PCT Application No. PCT/US10/049014", dated Apr. 3, 2012, 5 Pages.
"International Search Report and Written Opinion Issued in PCT Application No. PCT/US10/049014", dated May 25, 2011, 9 Pages.
"Office Action Issued in European Patent Application No. 10821024.6", dated Nov. 3, 2016, 9 Pages.
Tchenj, "Multi-Touch Behaviors on New Macbook/Pro Unibody", Retrieved from <<http://hints.macworld.com/article.php?story=20081030215945667>>, Oct. 31, 2008, 2 Pages.
"Office Action Issued in Canadian Patent Application No. 2771143", dated Apr. 27, 2016, 5 Pages.
"Notice of Allowance Issued in Australian Patent Application No. 2010300971", dated May 24, 2014, 2 Pages.
"Office Action Issued in Australian Patent Application No. 2010300971", dated Mar. 11, 2014, 3 Pages.
"Reply to Office Action Filed in Australian Patent Application No. 2010300971", Filed Date: Apr. 17, 2014, 30 Pages.
"Office Action Issued in Malaysian Patent Application No. PI 2012000899", dated Mar. 31, 2016, 3 Pages.
"Office Action and Search Report Issued in Chinese Patent Application No. 201080044004.X", dated Jan. 20, 2014, 14 Pages.
"Response to Office action Filed in Chinese Patent Application No. 201080044004.X", Filed Date: Jun. 4, 2014, 6 Pages.
"Response to Second Office Action Filed in Chinese Patent Application No. 201080044004.X", Filed Date: Dec. 15, 2014, 7 Pages.
"Second Office Action and Search Report Issued in Chinese Patent Application No. 201080044004.X", dated Sep. 30, 2014, 14 Pages.
"Supplemental Search Report Issued in Chinese Patent Application No. 201080044004.X", dated Sep. 23, 2014, 2 Pages.
"Third Office Action Issued in Chinese Patent Application No. 201080044004.X", dated Jul. 30, 2015, 11 Pages.
"Notice of Allowance Issued in Russian Patent Application No. 2012112226", dated Dec. 3, 2015, 15 Pages.
"Office Action Issued in Russian Patent Application No. 2012112226", dated Feb. 2, 2015, 5 pages. (W/o English Translation).
Adams, Chris, "i Phone Application Breakdown", Retrieved from <<http://web.archive.org/web/20090126225452/ http://ergonomics.about.com/od/buyingguide/tp/iphone_application_breakdown.htm>>, Retrieved on Oct. 12, 2009, 2 Pages.
"Office Action Issued in Japanese Patent Application No. 2012-532106", dated May 2, 2014, 7 Pages.
"Reply to Office Action Filed in Japanese Patent Application No. 2012-532106", Filed Date: Jul. 15, 2014, 3 Pages.
"Office Action Issued in Canadian Patent Application No. 2771143", dated Apr. 3, 2017, 5 Pages.

DYNAMIC IMAGE PRESENTATION

CROSS REFERENCE TO RELATED APPLICATIONS

This application is a continuation of U.S. patent application Ser. No. 12/770,988, filed Apr. 30, 2010, which claims the benefit of U.S. Provisional Application No. 61/247,456 filed Sep. 30, 2009, which are incorporated herein by reference in their entirety.

BACKGROUND

In computing environments, images can be retrieved from an image database and displayed on a variety of display screens, such as computer monitors, handheld devices, and others. Further, images can be displayed in a variety of formats. Commonly, when an image database comprises a collection of images a plurality of thumbnail versions of the images can be displayed on a screen at together. A "thumbnail view" may be a visualization of a collection of photos, such as from a folder, in which a large number or all of the photos are visible on the display and remaining photos can be observed by a simple scrolling action. Often, when a user wishes to view images from the image database, which can contain a few or thousands of images, they continually browse a displayed selection (e.g., scroll through) until they find a desired image or images. Additionally, images can be comprised of different sizes, aspect ratios, and layouts; and a user may be able to specify a size of a thumbnail version for preferred viewing on a display.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In a computing environment, when one wants to view images on a display screen they have typically been limited to a uniform packing arrangement. For example, if a user inputs a search query into an online search website, the site returns a limited display of some of the images from all of those meeting the search criteria. If a user is looking for a particular item, for example, from a shopping website, browsing all of the results returned may be quite cumbersome. Uniform image displays have some limitations, for example, they typically limit the size, location, and/or number of images to be displayed. Due to these limitations, the resulting images are often distorted to fit a certain aspect ratio, or the details cannot be distinguished because the resolution does not appropriately fit the displayed image size. Further, a lot of display space is left blank, often up to 70%, when using a uniform packing arrangement.

These problems are particularly exacerbated when the user is accessing the images from a mobile device screen, which is often very limited in size. The ability to get images from an image database to a user as quickly as possible is hampered by this type of uniform packing arrangement. Also, when a user zooms into or out of a "thumbnail view" the images and/or image details can be distorted, and display space can be additionally wasted, as the images are typically not arranged in a manner that mitigates "white space" (e.g., unused screen space). Therefore, it may be desirable display images to a user in their original aspect ratios, for example, and mitigate wasted display space in a dynamic layout to facilitate intuitive and useful user interaction with the images.

One or more image arrangement techniques and/or systems designed to arrange and/or display a plurality of images in an efficient packing arrangement, and provide for the efficient arrangement during zooming events of the displayed plurality of images are provided. Furthermore, one or more techniques and/or systems described herein provide for displayed images to comprise their original aspect ratio and layout, for example, thereby allowing a desirable resolution while minimizing, or substantially reducing, distortion. For example, the one or more techniques and/or systems described herein may enable a mobile device user to more efficiently retrieve and display a greater number of images per display screen, while maintaining aspect ratios, thereby having a resolution and distortion that gives the user a more desirable viewing experience.

To facilitate, at least some of, the same, a size of an image is scaled by an image scale factor, and during the scaling an aspect ratio for the image is maintained. In this embodiment, the image scale factor comprises a combination of a first scale distance and a second scale distance, for example, determined by a touch distance from a double touch gesture. The scaled image is filled into a first display line, such as a row or column, if the size of the scaled image is not greater than an amount of display space that is left in the first display line; otherwise the scaled image is filled into a second display line (e.g., the next row). The image is then expanded to mitigate white space in the display after the scaling, while maintaining the image's aspect ratio. In one sense, resulting presentations of images can be thought of as images being "reflowed" to display within a scrollable area.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
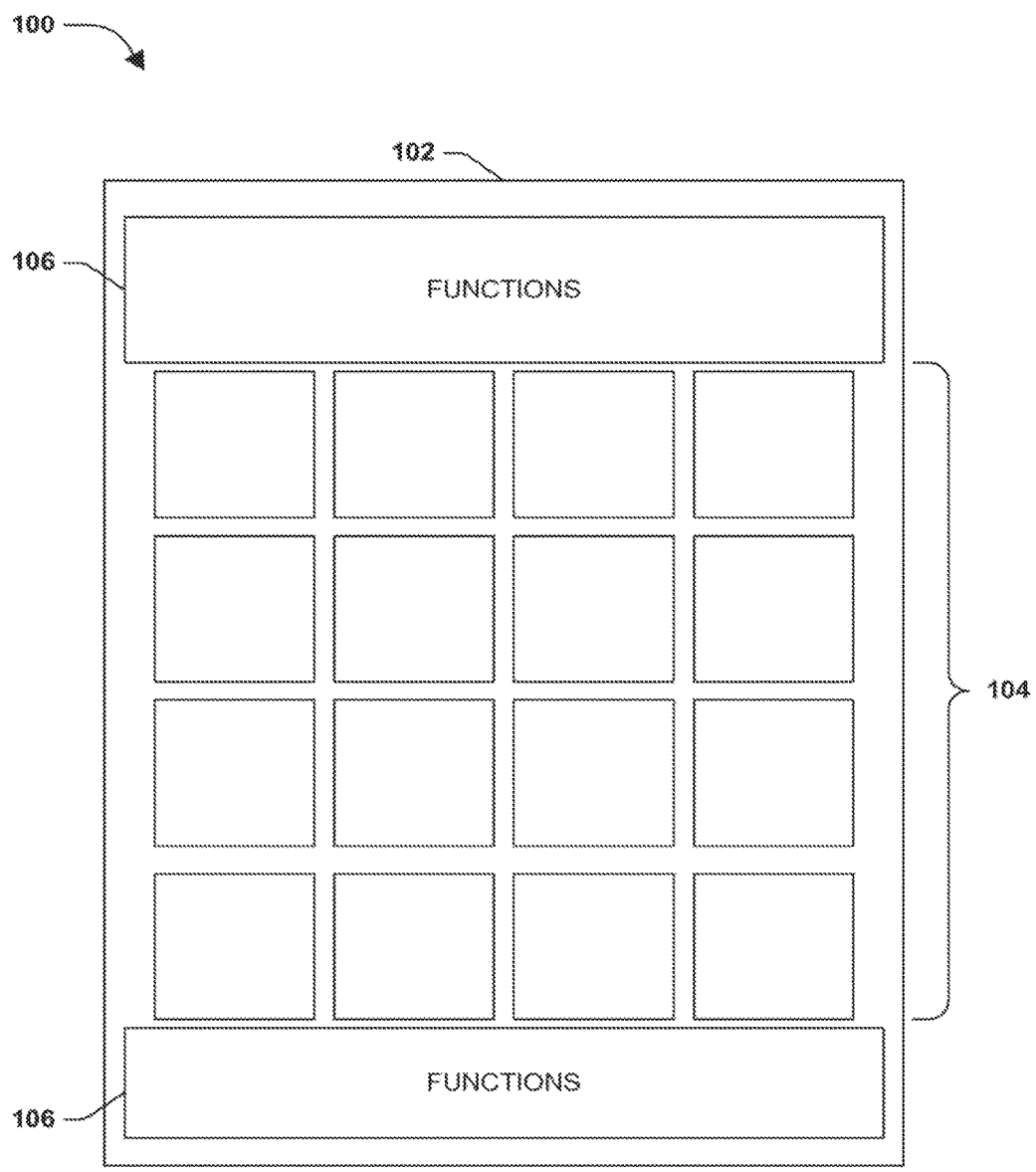
FIG. 1 is an illustration of an example display where images are square cropped.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Photo images are typically rectangular, having an aspect ratio of 4:3, 3:2, 16:9 or their transposes. Photo images displayed on a computing device, for example, comprising limited display space (e.g., a mobile device screen) can be displayed in a variety of ways. A variety of techniques can be used to provide for displaying a plurality of images on a display of limited size, such as: cropping (e.g., removing part of the image, at the top, bottom, sides, or a combination of each); inscribing various sized images in same sized display boxes (e.g., by distorting or cropping); constraining images to a same height or width; and distorting the image to fit into a predefined display size, are just a few examples.

FIG. 1 is an illustration of an example display 100 where images are square cropped. In this example 100, a display area 102, such as from a mobile computing device (e.g., mobile smart phone, portable media player (PMP), personal digital assistant (PDA), etc.) may comprise some function keys 106 (e.g., for a touch screen device) and a plurality of images 104. Here, the images 104 are displayed in a thumbnail view (e.g., reduced size), where more than one image can be displayed at a same time.

Further, in order to display a larger number of images in an organized arrangement, the images 104 have been square cropped. That is, for example, the sides and/or top and bottom of the image have been removed to create a square shaped thumbnail. Typically, a center of the image is chosen and the surrounding parts of the center that fit within a predefined cropping square are displayed, and the remaining parts outside the cropping square are not displayed in the thumbnail. Inherently, in this format, portions of the image are lost when the thumbnail images 104 are shown in the display area 102.

Figure 2:
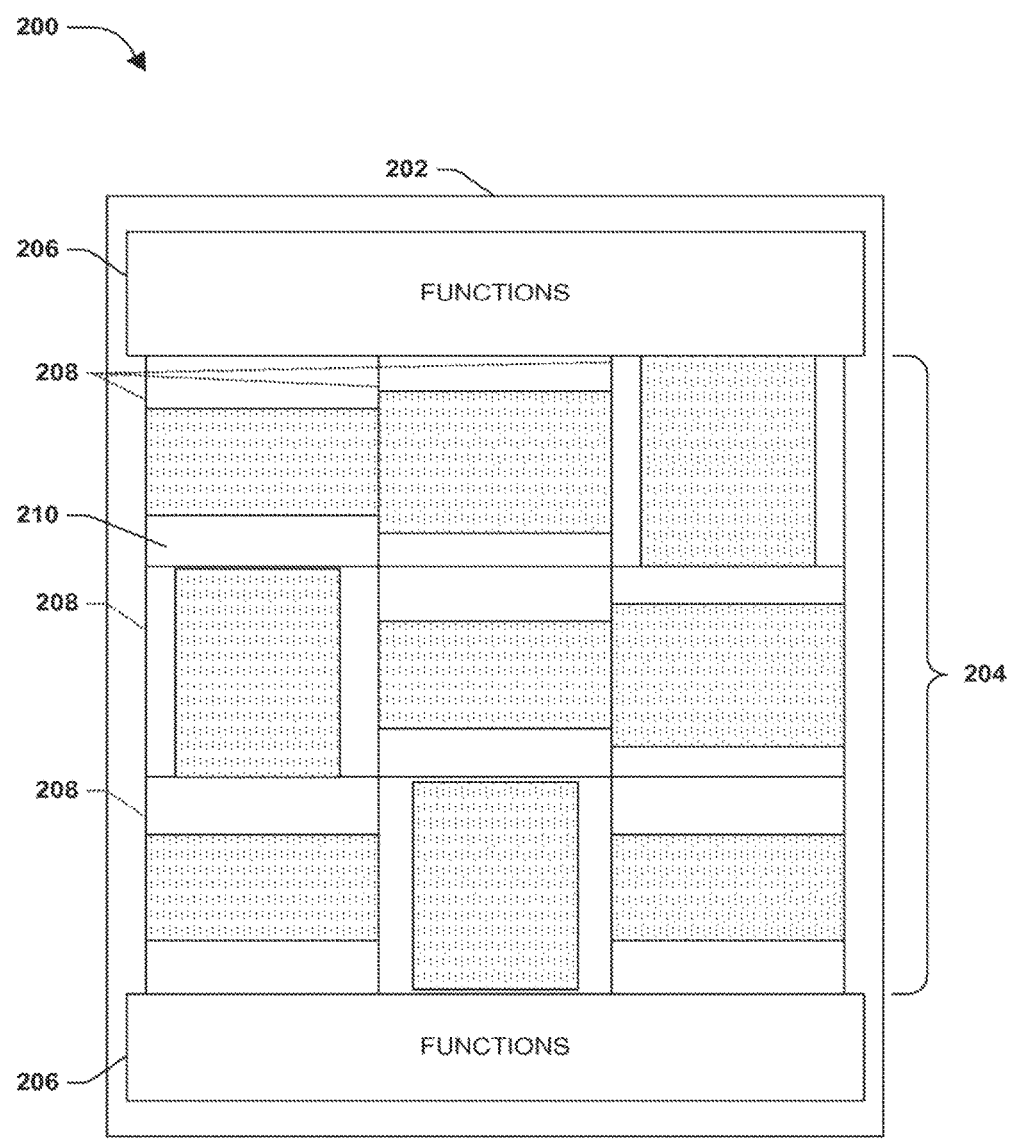
FIG. 2 is an illustration of an alternate example display where images are inscribed into same sized display boxes.

FIG. 2 is an illustration of an alternate example display 200 where images are inscribed into same sized display boxes. In this example 200, the display area 202, such as from a mobile device, may also comprise a function area 206 and a plurality of images 204. However, in this example 200, the respective images 204 are fit into display boxes 208 that are all a same size. That is, for example, regardless of whether the image is a portrait or landscape format (e.g., or some other aspect ratio), it is sized appropriately to fit merely inside the display box 108. Inherently, image quality can be lost when images are sized down to fit inside the display box 208. Further, this type of display creates a lot of "white space" 210 between images 204, wasting the screen display area 202.

Figure 3:
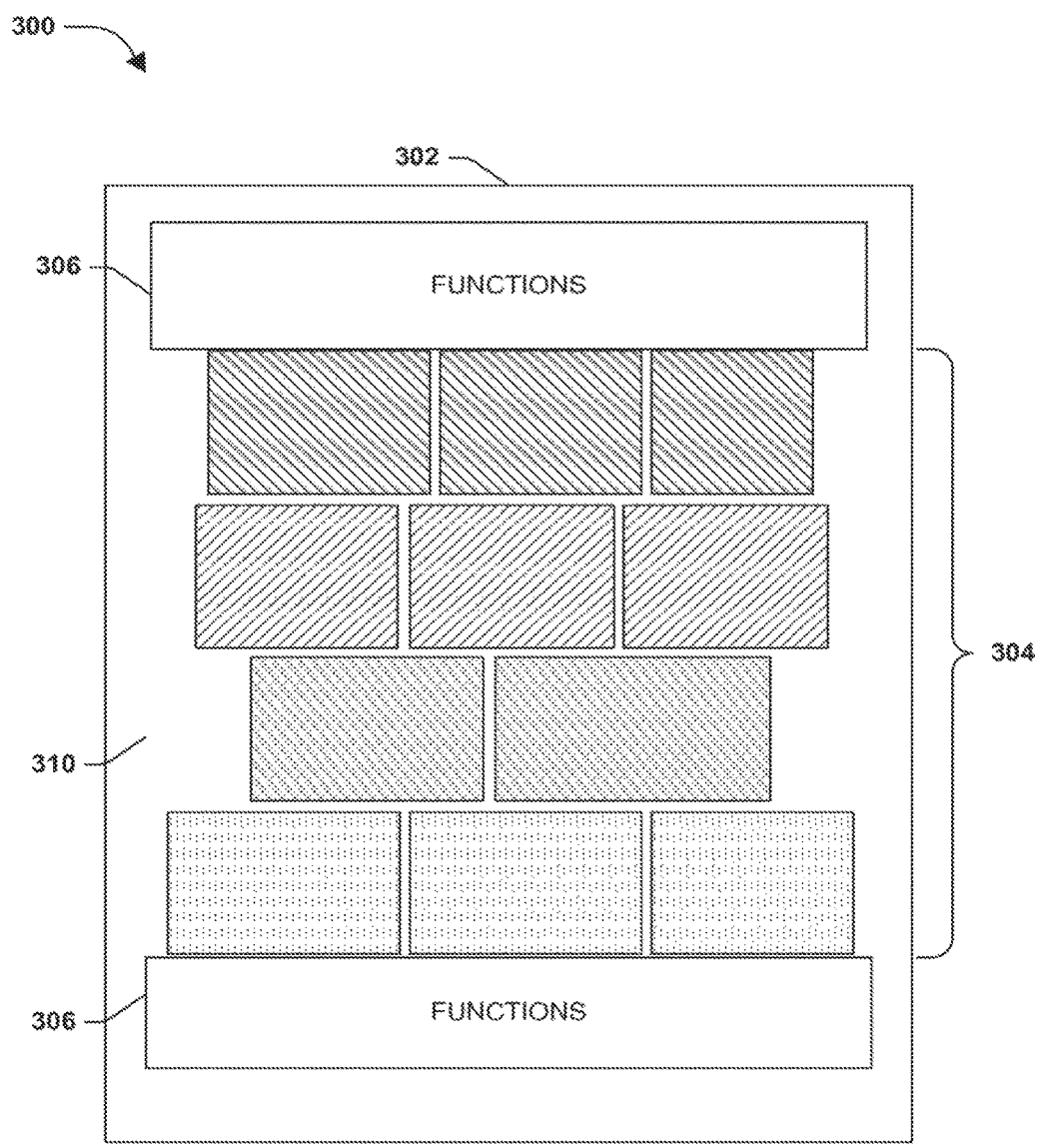
FIG. 3 is an illustration of an alternate example display where images are constrained to a same height in the display.

FIG. 3 is an illustration of an alternate example display 300 where images are constrained to a same height in the display. In this example 300, the display area 302 may also comprise a function area 306 and a plurality of images 304. However, in this example 300, the thumbnail images 304 are height constrained so that a row height for the images is fixed. Height constrained (or width constrained) thumbnail images can be cropped (e.g., from the top, bottom, or sides), and/or distorted to fit within the height constraints. Again, this type of display can reduce image quality and/or some of the image can be lost in cropping. Further, in this example 300, the images are center justified, which tends to create a lot of wasted "white space" 310 on either side of the images 304.

One or more methods may be devised that provide for a user interface (UI) for viewing photo thumbnails, where the thumbnails are displayed at an original aspect ratio (e.g., neither cropped nor inscribed in a different sized frame) and which use as much of a display as feasible (e.g., mitigates whitespace), yet provide a means of dynamic layout to facilitate intuitive and useful user interaction with the thumbnails, such as to resize (e.g., zoom in and out the view). In one embodiment, using one or more of the techniques described herein, a multi-touch UI, for example, can be combined with the native aspect ratio display of photo thumbnails, providing intuitive touch-driven zooming/scaling while mitigating wasted whitespace.

Figure 4:
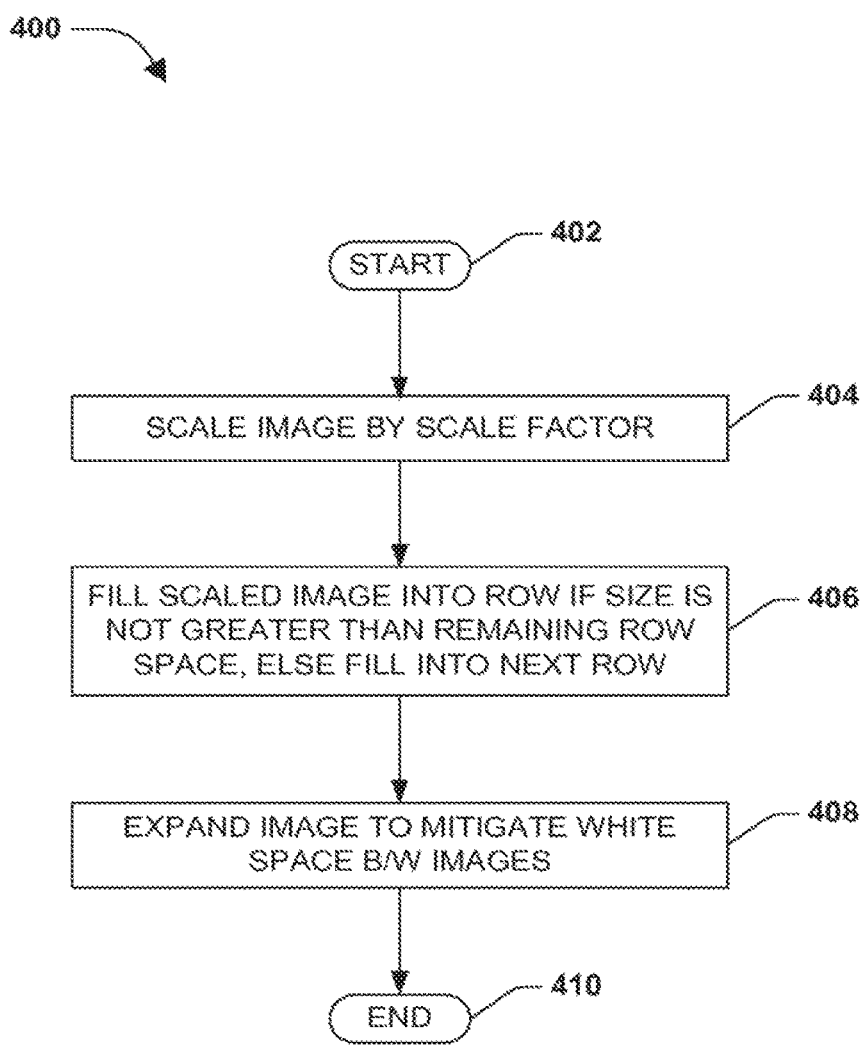
FIG. 4 is a flow diagram of an exemplary method for efficiently organizing images in a display of a computing device.

FIG. 4 is a flow diagram of an exemplary method 400 for efficiently organizing images in a display of a computing device. The exemplary method 400 begins at 402 and involves scaling the size of an image (e.g., increasing or decreasing the image's viewed size) while maintaining an image aspect ratio, at 404. Here, the image is scaled by an image scale factor that is a combination of a first scale distance and a second scale distance. Further, a plurality of images can be scaled by the scale factor at a same time. That is, for example, thumbnail images displayed in a UI are all scaled by the same scale factor at the same time, such as by increasing (e.g., zooming in) their size, or decreasing (e.g., zooming out) their size.

In one embodiment, the scale factor can be determined by combining the first scale distance and a second scale distance. As an example, the scale factor may comprise a function of a quotient of the second scale distance and first scale distance, such as:

$$Scalefactor = f\left(\frac{\text{second scale distance}}{\text{first scale distance}}\right).$$

Alternately, the following may be used:

$$\text{Second } Scalefactor = \text{First } Scalefactor \times f\left(\frac{\text{second scale distance}}{\text{first scale distance}}\right),$$

Where the first scale factor is a previous scale factor used to scale the images, and the second scale factor is a current scale factor to be determined for scaling the images.

It will be appreciated that the techniques described herein are not limited to any particular embodiment of determining scale factor for scaling the images. It is anticipated that those skilled in the art may devise alternate scale factor calculations.

For example, the scale factor may comprise a linear form for f (e.g., f(x)=x may have intuitive appeal). Such a linear form can vary the viewed image size in direct proportion to a scale distance. However, in this example, the function may not be sufficiently accurate at lower sized images, and insensitive at the larger sizes. As another example, to mitigate such an issue, other scale factor determinations may be used, such as:

$$f(x) = \frac{x + \sqrt[4]{x}}{2}$$

Further, for example, other smooth mapping for scale factor determination may be used, such as an exponential ( ) function.

In one embodiment, the computing device may comprise a touch sensitive display (e.g., resistive and/or conductive touch sensitive screen), where a double touch gesture can be used. For example, when two fingers are applied to the display and drawn toward each other (e.g., a pinch gesture) a zooming out of the display may occur. Alternately, when the two fingers are drawn away from each other a zooming in of the display may occur. In this embodiment, an application of a double touch to a touch-sensitive display can generate the first and second scale distances.

For example, a location of the two fingers when they are first placed on the screen can provide the first scale distance. That is, in this example, a distance between the two fingers can be determined, which can comprise the first scale distance. Further, the fingers can either be pinched together or apart, and the second scale distance can comprise the distance between the fingers during the pinch gesture or when it is completed. In this way, a first and second scale distance can be determined by the double touch gesture on the display screen.

Alternately, the first and second scale distances can be provided by detecting gestures, such as from a user. For example, a sensor (e.g., a light-based sensor, such as infrared, or some other particle, beam, or wave based sensor) may provide for a user's gestures to be detected and inferred to actions on a display. In this example, a first gesture may indicate the first scale distance and a second gesture may indicate a second touch distance. Further, other embodiments may utilize input tools, such as a keyboard, mouse, or other input devices to indicate a first and second scale distance.

In the exemplary embodiment 400 of FIG. 4, at 406, the scaled image is filled into a first display line (e.g., a row or column in the display) if the size of the scaled image is not greater than an amount of display space remaining in the first display line. Otherwise, if the size of the scaled image is greater than the remaining space the scaled image is filled into a second display line (e.g., a next row or column). For example, a basic layout algorithm can be applied that iterates over scaled (e.g., resized) images, filling row after row (or column after column), subject to a target row width (e.g., a variable named "screenwidth," although it may be smaller or larger than a physical display size).

In one embodiment, as the images are scaled (up or down), for example, the images can be added to a display row when zooming out, or moved to a next row when zooming in. Therefore, in this example, if a scaled image fits into a display row it is added (or left there) to the row, and if it does not fit it is added to the next row, until all of the images are displayed that can fit into the display view. That is, for example, if a display is zoomed in, the width and height of the screen will constrain a number of images displayed, based on the zoom level applied by a user. Further, the user may zoom out until all of the images in an album are displayed on the screen, for example. Additionally, in some embodiments, constraints may be applied that limit a number (e.g., minimum and/or maximum) of images displayed at one time, such as for aesthetics.

Figure 5A:
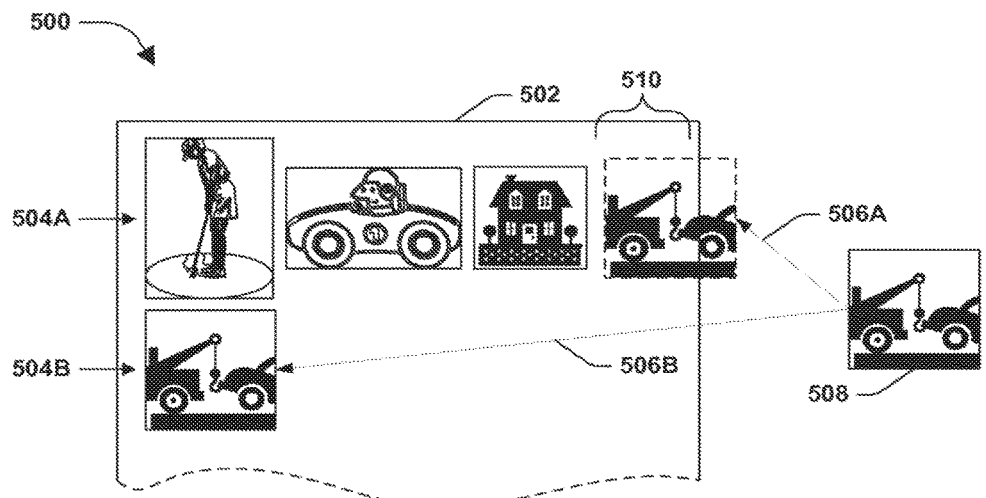
FIG. 5A is an illustration of an exemplary embodiment where images are filled into display lines in a display.

FIG. 5A is an illustration of an exemplary embodiment 500 where images are filled into display lines in a display. In this example 500, images are being filled into a display area 502, such as after or during scaling of the images. Here, display line 504A comprises three images that are already filled into the line, and image 508 is a next image that is to be filled into the display. It is apparent that the image 508 will not fit into the remaining space 510 of line 504A if the image was to be filled 506A in at this location. Therefore, the image 508 is filled into 506B the next display line 504B.

At 408 of the exemplary embodiment 400, the scaled image is expanded to mitigate white space in the display after scaling, while maintaining the image's aspect ratio. For example, as illustrated in FIG. 5A, the space remaining 510 in display row 504A comprises wasted "white space." In this embodiment 400, the white space can be mitigated by expanding the size of the images in the display line, such as by scaling up the images in display row 504A to fill in the remaining space 510.

In one embodiment, because the images' aspect ratios are maintained when expanding in the display lines, for example, the row or column will expand in at least two directions (e.g., across to fill a row, and down to accommodate the aspect ratio during expansion). In this embodiment, expanding the display line facilitates in mitigating white space, but may also cause fewer display lines to be viewed on the display (e.g., by expanding rows down, some rows may be pushed out of the viewed display).

Figure 5B:
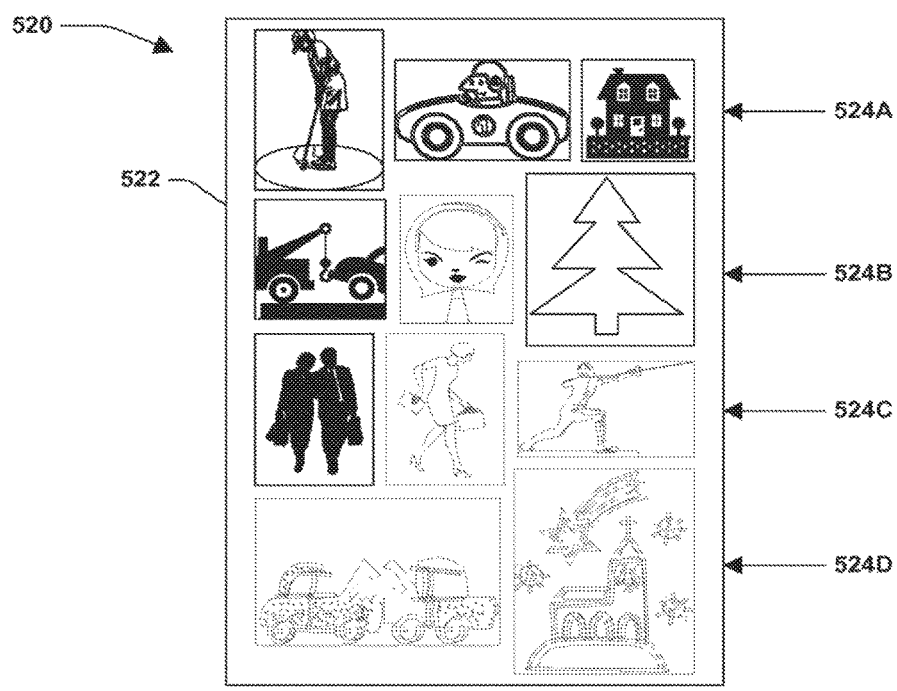
FIG. 5B is an illustration of an example embodiment where the display lines are filled with images and the images are expanded to mitigate white space.

FIG. 5B is an illustration of an example embodiment 520 where the display lines are filled with images and the images are expanded to mitigate white space. The display area 522 comprises a plurality of thumbnails that have been filled into respective display rows 524. Here, the images in row 504A of FIG. 5A have been expanded to fill the row 524A of FIG. 5B, mitigating the remaining white space 510 prior to expansion. Further, as illustrated in the example 520, while the images and, consequently, the rows are expanded to mitigate white space, images in adjacent rows can overlap "row space" of an adjacent row. For example the first image of row 524A overlaps "row space" with the third image of 524B; the third image of 524B overlaps "row space" with the second image in row 524O; and the second image in row 524C overlaps "row space" with the second image of row 524D. This feature further mitigates row space, as will be discussed below.

In one embodiment, during a multi-touch pinch event for example, a layout algorithm can be used to maximally fill respective rows of image thumbnails until no additional thumbnails can be added, and additional area (e.g., white space) is consumed by scaling up the entire row. Successive rows of thumbnails can be vertically aligned so as to minimize a gap between rows. For example, these horizontal and vertical expansion operations can provide a user with a non-distracting visual feedback while the user chooses a view that spans from a few to a hundred thumbnails on a typical screen.

Having expanded the image(s) to mitigate white space, the exemplary method 400 of FIG. 4 ends at 410.

In one aspect, a display that provides for zooming in and out of a plurality of thumbnail images, for example, and organizes the images in a "packed" and visually appealing manner may provide for scrolling through an album of images. For example, a plurality of images may be compiled in an album that has a sort or storybook quality, where a user can maintain a sense of location in the album during scrolling and zooming.

In one embodiment, scrolling the display of images in merely two opposite directions may be provided for, such as either horizontally or vertically. That is, the images may be scrolled up and down, or left and right, for example. In this embodiment, the provision for scrolling in the merely two opposite directions can be maintained after scaling. For example, if the multi-touch zooms in to the display of images, thereby reducing a number of images displayed, the user may still be able to scroll through the images in the same opposite directions as available before the scaling of the images. In this example, if the album of images could be scrolled up and down before scaling, they can be scrolled up and down after scaling.

Further, in this aspect, a direction of scrolling can define the display line, for example. In one embodiment, the display line can comprise a horizontal row if the opposite directions of scrolling are up and down; and the display line can comprise a vertical column if the opposite directions of scrolling are left and right. That is, for example, when the display of images can be scrolled up and down through an album of image, the display line is a row. In this example, when the display of images is able to be scrolled side to side, the display line is a column.

Figure 6:
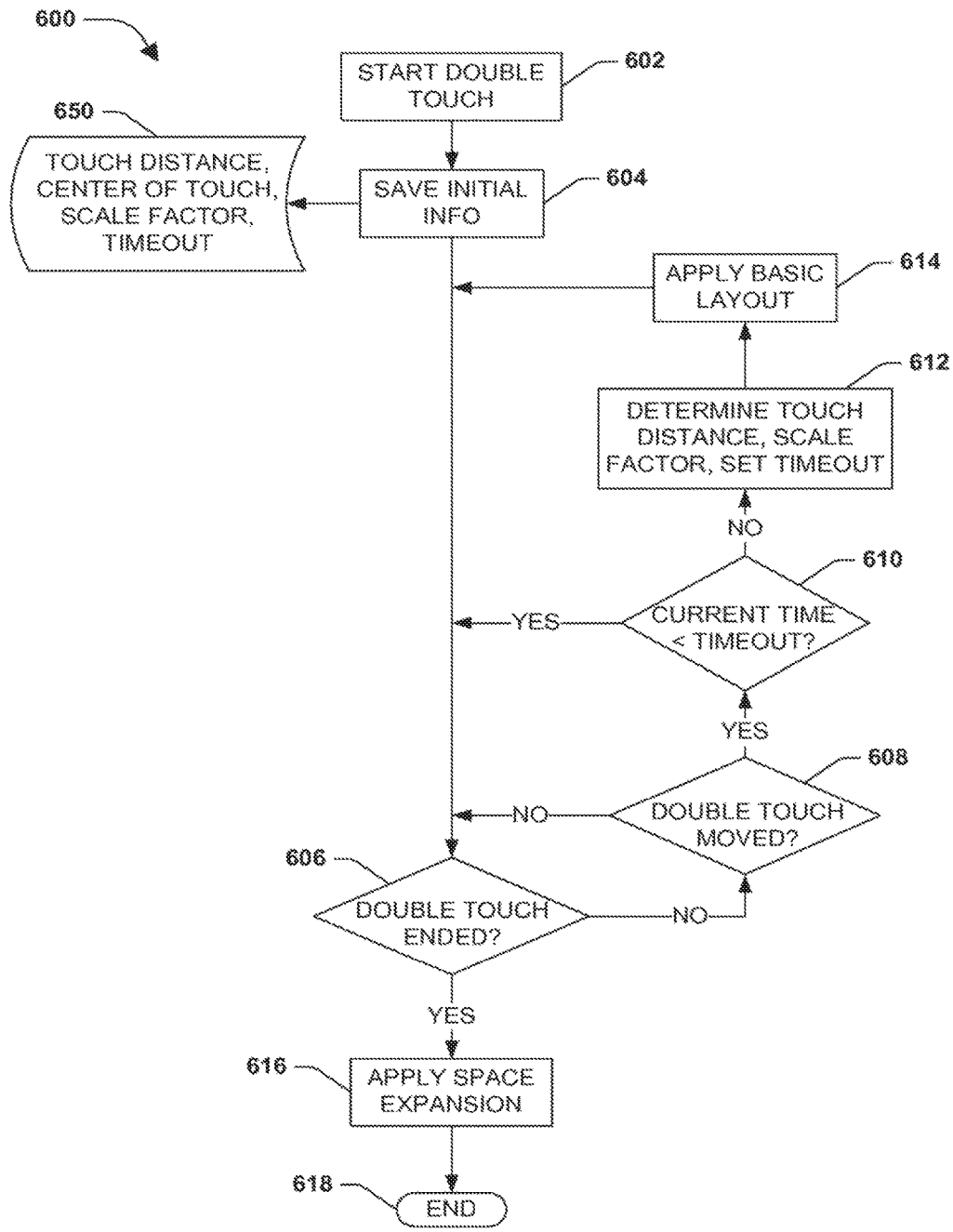
FIG. 6 is a flow diagram illustrating an example embodiment of a portion of a method where images may be organized in a display according to one or more techniques described herein.

FIG. 6 is a flow diagram illustrating an example embodiment 600 of a portion of a method where images may be organized in a display one or more techniques described herein. At 602, a double touch (multi-touch) begins, such as when a user applies two fingers to a touch sensitive screen. In another embodiment, such an event may occur using detected gestures, such as by using a sensor to detect a double touch; or some other input device may be used to initiate and perform a double touch event.

At 604, initial information generated by the double-touch event is saved. When a multi-touch event is detected, a distance between the two touches on the screen (or detected inputs, gestures), and saves a current "scale factor" which can be a state variable of an algorithm run at the multi-touch detection, for example. In one embodiment, a current time can be identified, and a suitable "timeout period" can also determined, at 650.

In one embodiment, the "scale factor" can be a variable internal to an image layout algorithm that describes a size of the layout image thumbnails. This can roughly correlate with a dimension of the bounding box in which an image can be displayed and scaled, for example, or (in a reciprocal sense) a width of the display area divided by the size of the bounding box. For example, the scale factor can be defined as a continuous variable (e.g. a floating point, or a fixed point value with fine granularity), so it may be possible to vary the scale factor by fractional numbers.

As described above, in one embodiment, to determine the scale factor a first inter-touch distance of the double touch can be determined. For example, a distance between two fingers used to touch the screen for a multi-touch event can be measured. In one embodiment, if the multi-touch is a first multi-touch, the scale factor may merely be the integer one, as the scale is initiated with the first multi-touch.

Further, a current time and timeout period can be selected for the algorithm, for example. The timeout period may be used for governing actions, such as for computing devices with limited CPU power. As an example, an application may go unresponsive due to limited CPU, so in order to keep work flow going, the timeout manages the flow process by causing event that occur too frequently to be ignored until user done with touch event (e.g., 0.02 second timeout). In this example, current time can also be used along with the timeout to manage work flow.

At 606 in the exemplary embodiment 600, the double-touch event is monitored to see if it is ended. If the double touch is still in progress (NO at 606) it is determined whether the double-touch distance has changed, at 608. If the double-touch distance has not changed (e.g., pinch gesture has not moved) the flow diagram returns to 606 to wait for a change in the double-touch status. If the double touch distance has changed (YES at 608) it is determined whether the timeout has been reached, at 610.

That is, in this example, if the current time is less than the selected timeout value, the time out has not been met (YES at 610). In this example, the timeout can mitigate an overflow of data for a CPU that does not have sufficient processing power. That is, if the time out has not been met the event is not processed, for example. However, if the time out is met (NO at 610), a second touch distance can be determined, at 612, and a second scale factor and a new timeout value can be determined. In one embodiment, the second touch distance comprises a second inter-touch distance of the double touch, such as between two fingers place by a user on a touch sensitive screen.

Further, in this embodiment, the first inter-touch distance and the second inter-touch distance can be combined to generate the image scale factor. As described above, the scale factor may comprise a function of a quotient of the second scale distance and first scale distance, for example. In this example, the first scale factor can be a previous scale factor used to scale the images, and the second scale factor can be a current scale factor to be determined for scaling the images.

Figure 7:
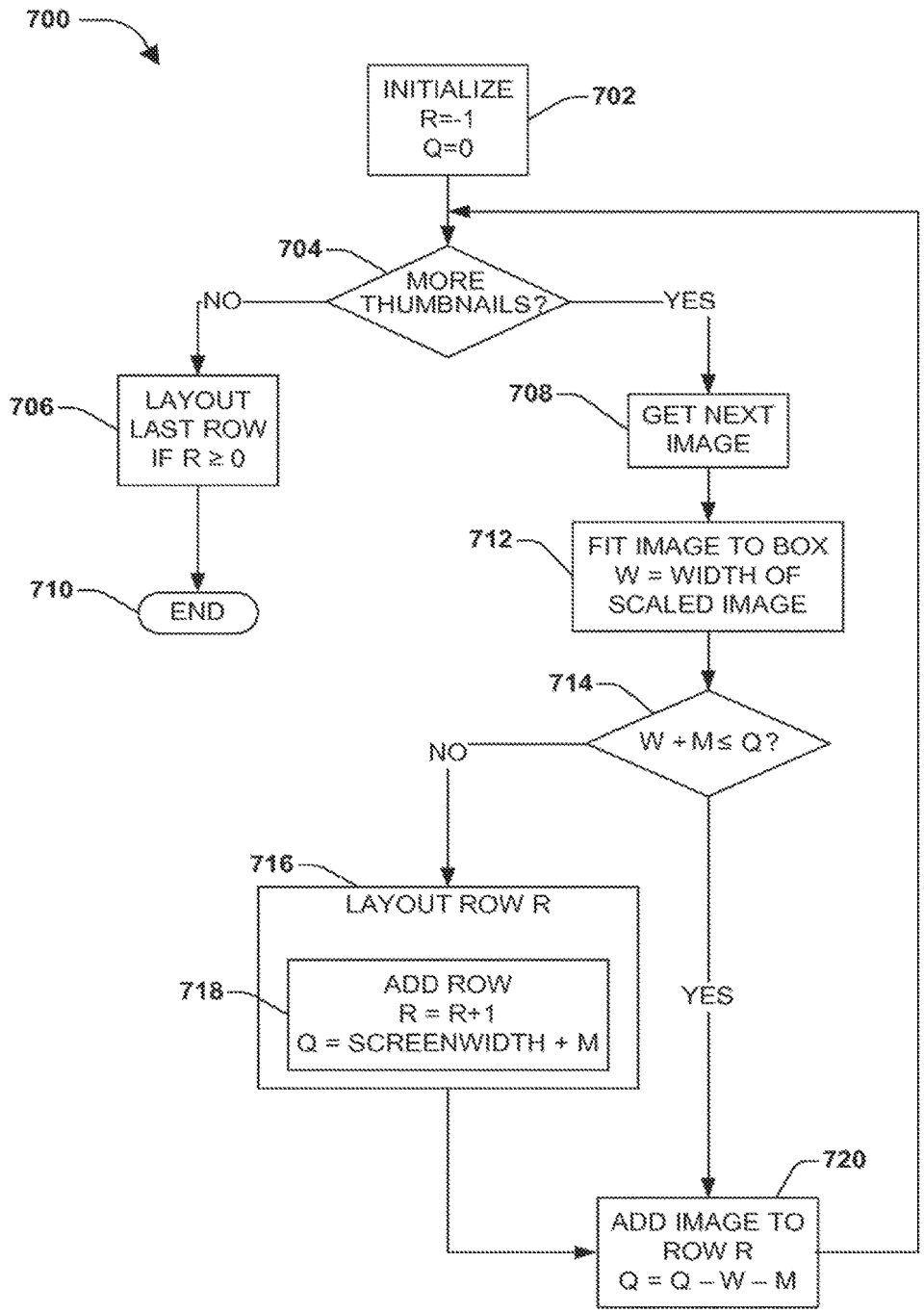
FIG. 7 is a flow diagram illustrating an exemplary embodiment of a portion of a method where a basic layout algorithm can be applied.

At 614 in the exemplary embodiment 600, a basic layout algorithm can be applied, such as to layout the thumbnail images in accordance with the second scale factor. FIG. 7 is a flow diagram illustrating an exemplary embodiment 700 of a portion of a method where a basic layout algorithm can be applied. In this exemplary embodiment 700, Q can be a variable that refers to an amount of space remaining in a current row R. Further, in one embodiment, a desired margin can be set between thumbnails images to be laid-out, which can be designated by M.

At 702, the variables can be initialized, such that R (the row) is set at negative one, and Q (the space left in the current row) is set to zero. In this way, if there are any thumbnails to be added they will be added to the first row. At 704, if there are more images to be added to the scaled display, the next image is retrieved at 708, such as from computer memory.

In one embodiment, when an image is scaled (up or down) an image display box can be determined for the image, which comprises a combination of the image scale factor and the aspect ratio of the image. Further, the scaling of the image can comprise resizing the image to fit inside the display box. For example, a display box can be used to scale the images, where the display box dimensions are determined by the scale factor, while maintaining an original aspect ratio. In this example, the scale factor can define the bounding box size, and limits may be placed at the low and high ends on the bounding box size. Therefore, as a touch distance increases or decreases, the scale factor increases or decreases, for example, and the bounding box will increase or decrease in size.

At 712, the image is fit into the bounding box, which has been scaled (e.g. up or down, according to scale factor), and a variable W is set to be equal to a width of the image. If W (the width of the image) combined with M (the desired margin) is less than or equal to Q (the space left in the row), YES at 714, the image can be added to the current row (R), at 720. That is, the scaled image is filled into the display line, such as a row or column, if the size of the desired margin between images combined with the size (e.g., width for row, or height for column) of the scaled image is not greater than the amount of display space remaining in the display line.

After the image is added, at 720 Q is set to the combination of Q less W less M (e.g., current amount of space left in row is set to previous amount of space minus the margin minus the width of the image). In one embodiment, after the display line (row or column) is full, the margin between images can be increased to provide a justified appearance for the images in the display line (e.g., right, left or center justified).

However, when a first image is laid-out Q is set to zero, therefore, at 714, the combination of W and M are going to be greater than Q (NO at 714); which will also occur when the image cannot fit into a current row. At 716, a row (or column) is laid-out, which comprises adding a next row, at 718. Further, the variable R is updated to equal the next row (R+1), and Q is updated to be equal to a value for the screenwidth combined with the margin value (M). In this way, as an example, a new row (or column) is added to the display to which the image can be added, such as at 720.

In the exemplary embodiment 700, after the image is added to the row, the flow returns to determine if there are more images, at 704, where additional images and rows can be added, as described above. However, if no more thumbnails images are available for the display, NO at 704, the last row can be laid out, at 706. In this example, the last row is laid out only if R is greater than or equal to zero, that is, where there is at least one row. Having laid out the last row the exemplary embodiment ends at 710.

Returning to FIG. 6, in the exemplary embodiment 600, if the double touch has ended, such as by a user removing their fingers from the touch screen, space expansion is applied, at 616, and the exemplary embodiment 600 ends at 618. In one embodiment, expanding the image is performed to mitigate white space in the display, for example, thereby filling more of the display and mitigating wasted screen space. The expansion can comprise expanding the respective images in a display line by an expansion factor while maintaining their respective aspect ratios and a desired margin between images.

For example, an expansion factor (S) may be determined that allows the images to expand proportionally to fill unused space for the lines. In one embodiment, images in a row are expanded by the same expansion factor S, for which an exemplary rule can be constructed, for example, that keeps the margin unchanged by introducing a scaling on the summation, such as:

$$m = \frac{1}{N-1}\left\{ScreenWidth - s \sum_{k=i}^{k=i+N-1} w_k\right\}$$

which can give the following expression for S:

$$s = \frac{ScreenWidth - m(N-1)}{\sum_{k=i}^{k=i+N-1} w_k}$$

In one embodiment, while the images can be expanded by the scale S as computed, the vertical margins may no longer hold if S>1. In this embodiment, for the images to be correctly spaced vertically, for example, the current row can be shifted downwards. One solution to this issue, for example, can be to find a vertical offset of adjacent rows and the scaled sizes of the images in these two rows.

Therefore, expanding the images to mitigate white space can comprise determining a display distance between the second display line (R) and the first display line (R-1). That is, for example, determining a distance between a current row and the previous row, by looking at a distance between the closest images in the respective rows. Further, in this embodiment, the respective images in the second display line can be shifted toward the first display line by a distance equal to a combination of the display distance and a desired margin.

In one embodiment, determining a display distance can comprise iteratively determining an offset value of the second display line (R) given an offset value of the first display line (R-1), for respective images in the display lines until a smallest display distance between the display lines is determined. As an example, an "event list" can be formed for an upper row, which may be a sequence of x and y coordinates of a left bottom corner of the scaled, horizontally laid out images in the R-1 th row. Likewise, in this example, an event list can be formed for the current row comprising the x and y coordinates of a left top corner of the scaled, horizontally laid out images of the R th row.

In this embodiment, vertical alignment can proceed as follows: a first event in the upper row event list is picked, where event coordinates are $X_U$, $Y_U$; the first event in the lower row event list is picked, where the event coordinates are $X_I$, $Y_I$, the quantity D is set to $D = Y_I - Y_U$; while there are remaining events in either event list, the next event with a smaller X coordinate can be picked from one of the two lists, if from the upper list, then its coordinates replace $X_U$, $Y_U$, else its coordinates replace $X_I$, $Y_I$; within this loop, a new value of $D_{new} = Y_I - Y_U$ is calculated and D is updated if $D_{new} < D$.

In this embodiment, when both lists are exhausted, a final value of D is a smallest vertical margin between the rows. This value of D may be negative, which may represent a highest degree of overlap between images from respective rows (or columns). Subsequently, for example, images in the R th row can be shifted upwards by a quantity=D-V, where V represents some vertical spacing distance, such as a margin M.

As described above, the image can be expanded to mitigate white space and the image is expanded such that a D may be negative, representing a degree of overlap between images. In one embodiment, the first image in a first display line and a second image in a second adjacent display line can be coincident in a first axis that is orthogonal to a direction of scrolling the display. In this embodiment, at least a space equivalent to a desired margin can separate the first image and second image along a second axis that is parallel to the direction of the scrolling.

Figure 8:
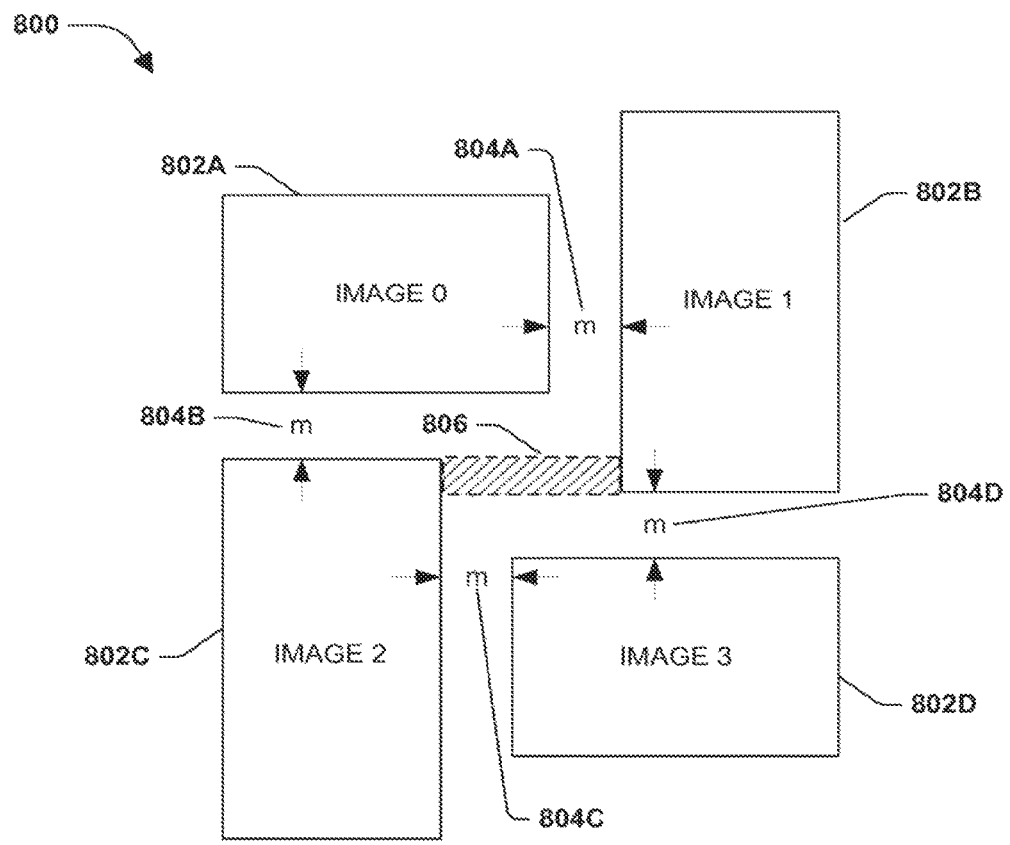
FIG. 8 is an illustration of an exemplary embodiment where images may overlap between adjacent rows or columns.

FIG. 8 is an illustration of an exemplary embodiment 800 where images may overlap between adjacent rows or columns. Four images 802 are laid out where images 802A and 802B are in a first row, and images 802C and 802D are in an adjacent row. Further, images 802B and 802C overlap by some distance 806, such as a negative D value, as described above. Additionally, the respective images maintain a desired margin M 804 between the images. In this way, as an example, the images can be expanded closely toward each other to mitigate white space, even crossing into horizontal lines that each rows share (e.g., 806).

In one aspect, when a multi-touch gesture is used to scale up (zoom in) or scale down (zoom in) thumbnail images in a display, an image that is central to the multi-touch gesture can remain central during the gesture. That is, for example, if a user were perform a pinch gesture on a touch sensitive screen, thereby zooming out the display of thumbnails, increasing a number in the view, the image at the center of the pinch can remain in the center, for example, to provide a more intuitive experience for the user (e.g., they don't lose the image offscreen as the display is scaled).

In one embodiment, in this aspect, a central image can be identified, such as when the double touch is initiated. In this embodiment, identifying the central image may comprise selecting the image that comprises a center point area of the first scale distance. For example, the center point of a line that comprises the intertouch distance of the double touch can be identified, and the image that comprises (or is closest to) that point can be the central image. Further, after scaling the images, the central image is maintained in the display line between endpoints of the second scale distance after scaling. That is, for example, after the double touch ends, the central images can be in a row that is between the double-touch.

Figure 9A:
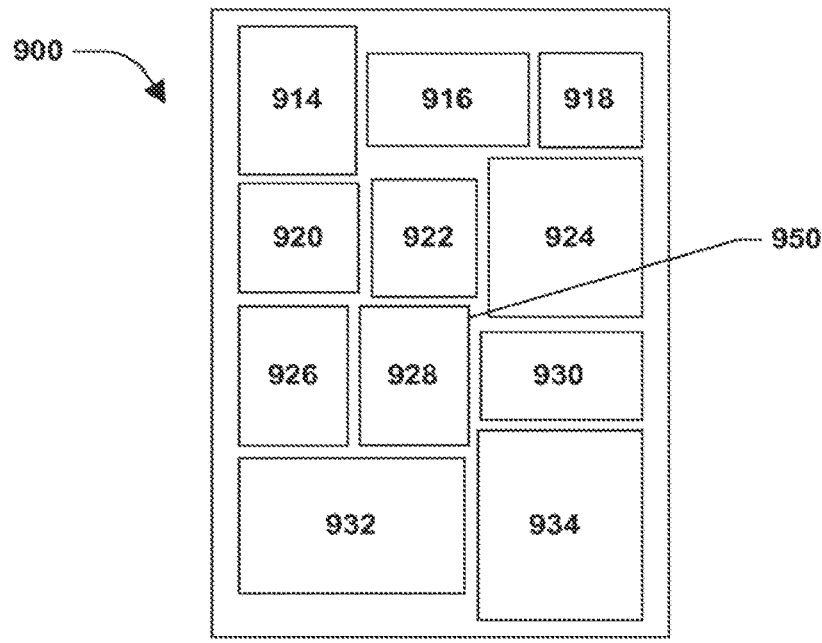
FIGS. 9A and 9B illustrate exemplary embodiments where a central image is maintained after scaling.
Figure 9B:
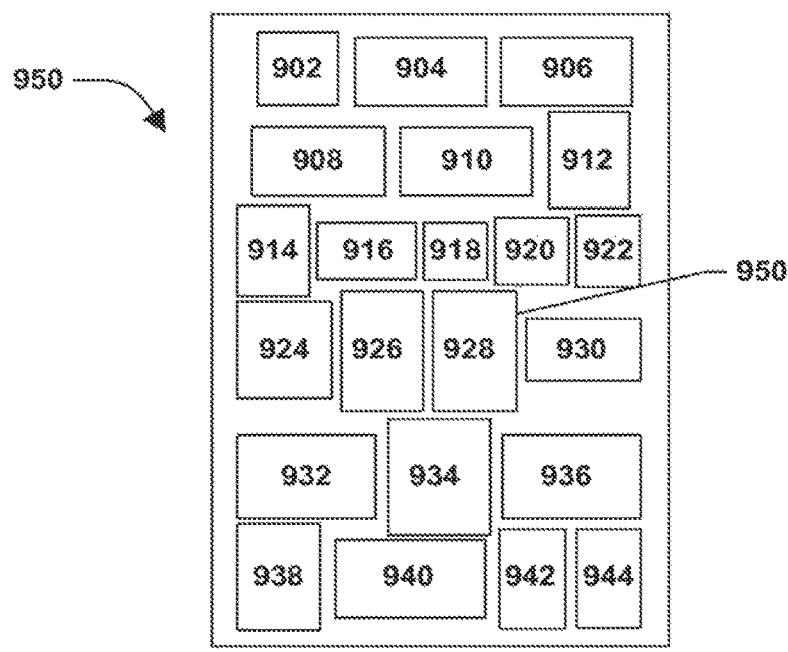

FIGS. 9A and 9B illustrate exemplary embodiments where a central image is maintained after scaling. In FIG. 9A, a display area 900 comprises a plurality of ordered images 914-934, which are laid out in accordance with the techniques described herein, such that the white space is mitigated, for example. A double touch can be initiated, such that the central image 950 comprises image 928. In this embodiment, the display is zoomed out, for example, by performing a double-touch pinch gesture, where two points are drawn together.

In FIG. 9B, the display 950 comprises the same ordered images from 9A 914-934, which are in the same order as before the scaling event 900. Further, as the display is zoomed out, additional images are added at the top 902-912, and at the bottom 936-944. However, the central image 950 can remain at a location that is between the double touch gesture as it was drawn together. In this way, the user may be interested in a particular image or area of the album comprising many images, and that area remains in the central view during and after the scaling event.

Figure 10:
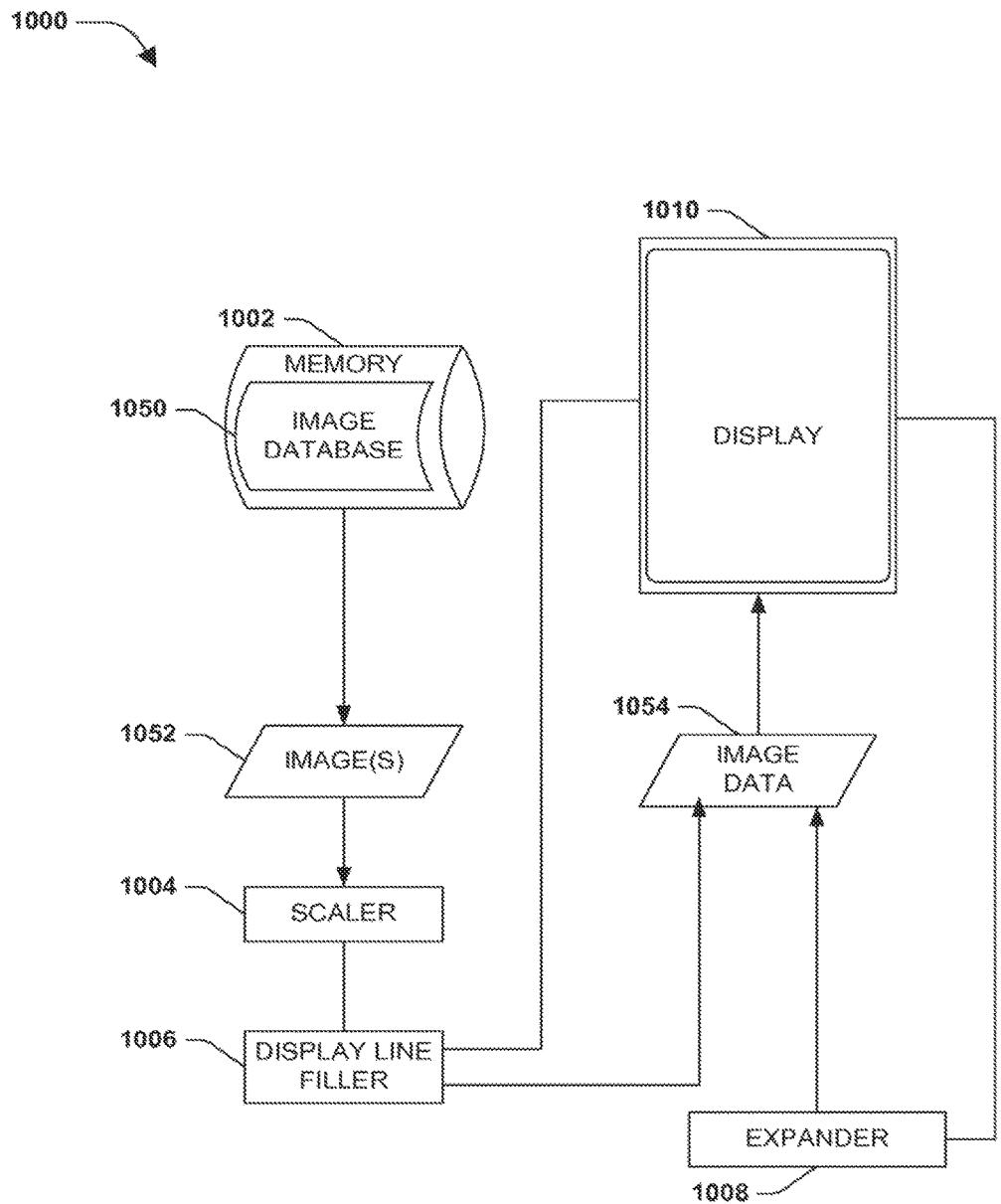
FIG. 10 is a component diagram of an exemplary system for efficiently displaying images in a computing environment.

A system may be devised that provides for viewing photo thumbnails, where the thumbnails are displayed at an original aspect ratio, which uses as much of a display as feasible, yet provides a means of dynamic layout to facilitate intuitive and useful user interaction with the thumbnails, such as to resize. FIG. 10 is a component diagram of an exemplary system 1000 for efficiently displaying images in a computing environment.

A display component 1010 is configured to display images, and a memory component 1002 configured to store image data, such as in an image database 1050 comprising the images to be displayed. A scaling component 1004 that is operably coupled with the memory component 1002 scales a size of an image 1052 using an image scale factor while maintaining an image aspect ratio. Here, the image scale factor is derived from a combination of a first scale distance and a second scale distance, such as from a multi-touch event (e.g., a double touch on a touch sensitive screen).

A display line filling component 1006, which is operably coupled with the image scaling component 1004 and the display component 1010, fills the scaled image 1054 into a first display line on the display 1010 if the size of the scaled image is not greater than an amount of display space remaining in the first display line. Otherwise, the image scaling component 1004 fills the scaled image 1054 into a second display line on the display 1010. An expansion component 1008 is operably coupled with the display component 1010, and it is configured to expand the image 1054 to mitigate white space on the display after scaling.

Figure 11:
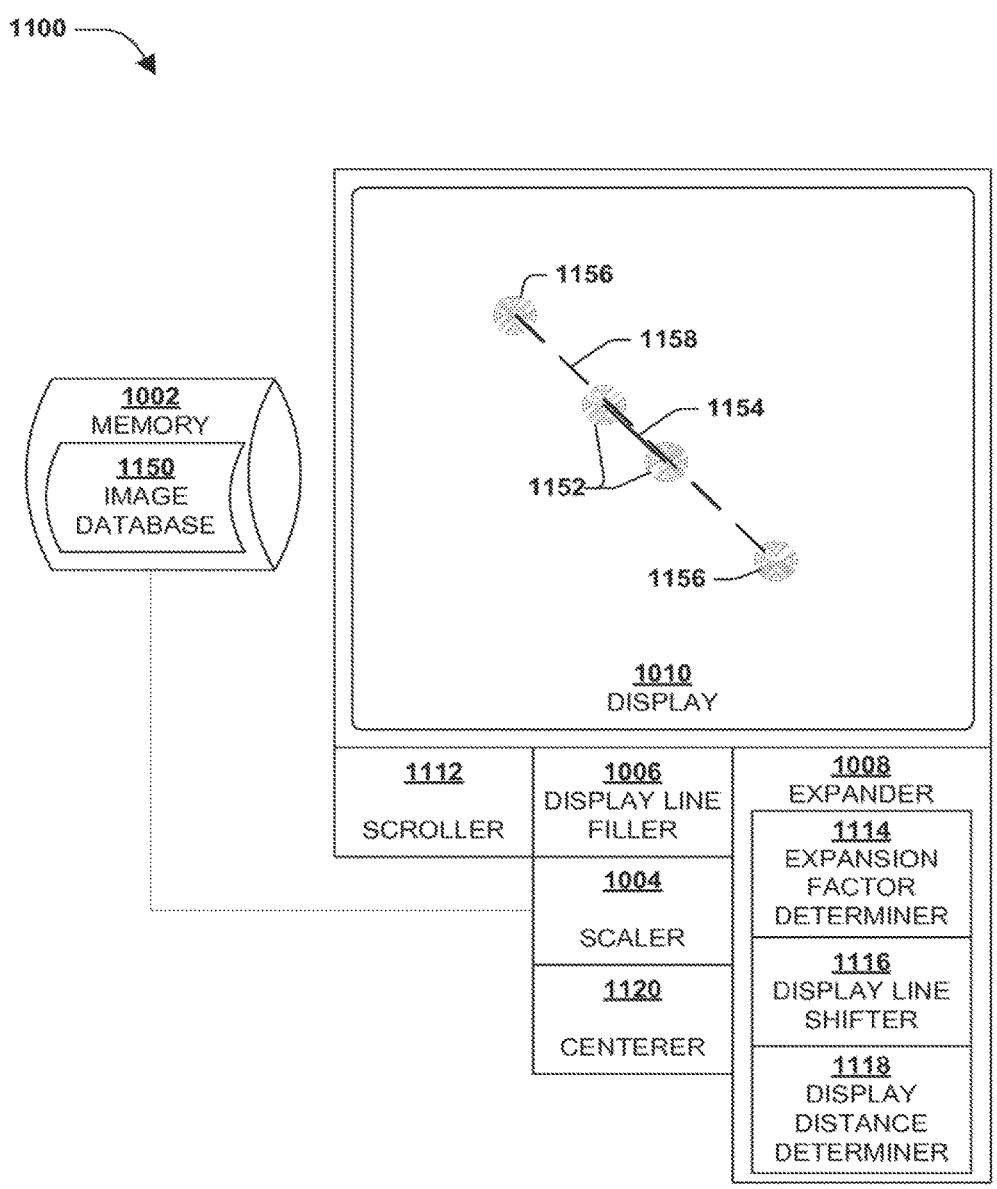
FIG. 11 is a component diagram of one exemplary embodiment where a system for efficiently displaying images in a computing environment may be implemented.

FIG. 11 is a component diagram of one exemplary embodiment 1100 where a system for efficiently displaying images in a computing environment may be implemented. In this embodiment 1100, the display component 1010 comprises a touch-sensitive display that provides for applying a double-touch 1156, 1152 to the display component 1010 to generate the first and second scale distances 1154, 1158.

Further, the exemplary system can comprise an image centering component 1120, which can be configured to identify a central image by selecting the image that comprises a center point area of the first scale distance. For example, the image centering component 1120 may select an image that is central to the double-touch 1156. The image centering component 1120 can also be configured to maintain the central image in a display line between endpoints of the second scale distance after scaling, such as between the double-touch 1152.

In the exemplary embodiment 1100, a scrolling component 1112 can be configured to provide for scrolling images on the display in merely two opposite directions, such as up and down, or left and right. Further, the scrolling component 1112 can maintain the scrolling in the merely two opposite directions after scaling. In this embodiment, the display line can comprise a horizontal row if the opposite directions of scrolling are up and down; or a vertical column if the opposite direction of scrolling is left and right.

In the exemplary embodiment 1100, the expansion component 1008 comprises an expansion factor determination component 1114 that calculates an expansion factor for the image that mitigates white space between respective images in a display line while maintaining a desired margin between images. Further, the expansion component 1008 comprises a display line shifting component 1116 that can determine a display distance between the second display line (R) and the first display line (R−1); and shift respective images in the second display line toward the first display line by a distance equivalent to a combination of the display distance and a desired margin. Additionally the expansion component 1008 can comprise a display distance determination component configured to determine a display distance by iteratively determining an offset value of the second display line (R) given an offset value of the first display line (R−1), for respective images in the display lines until a smallest display distance between the display lines is determined.

Figure 12:
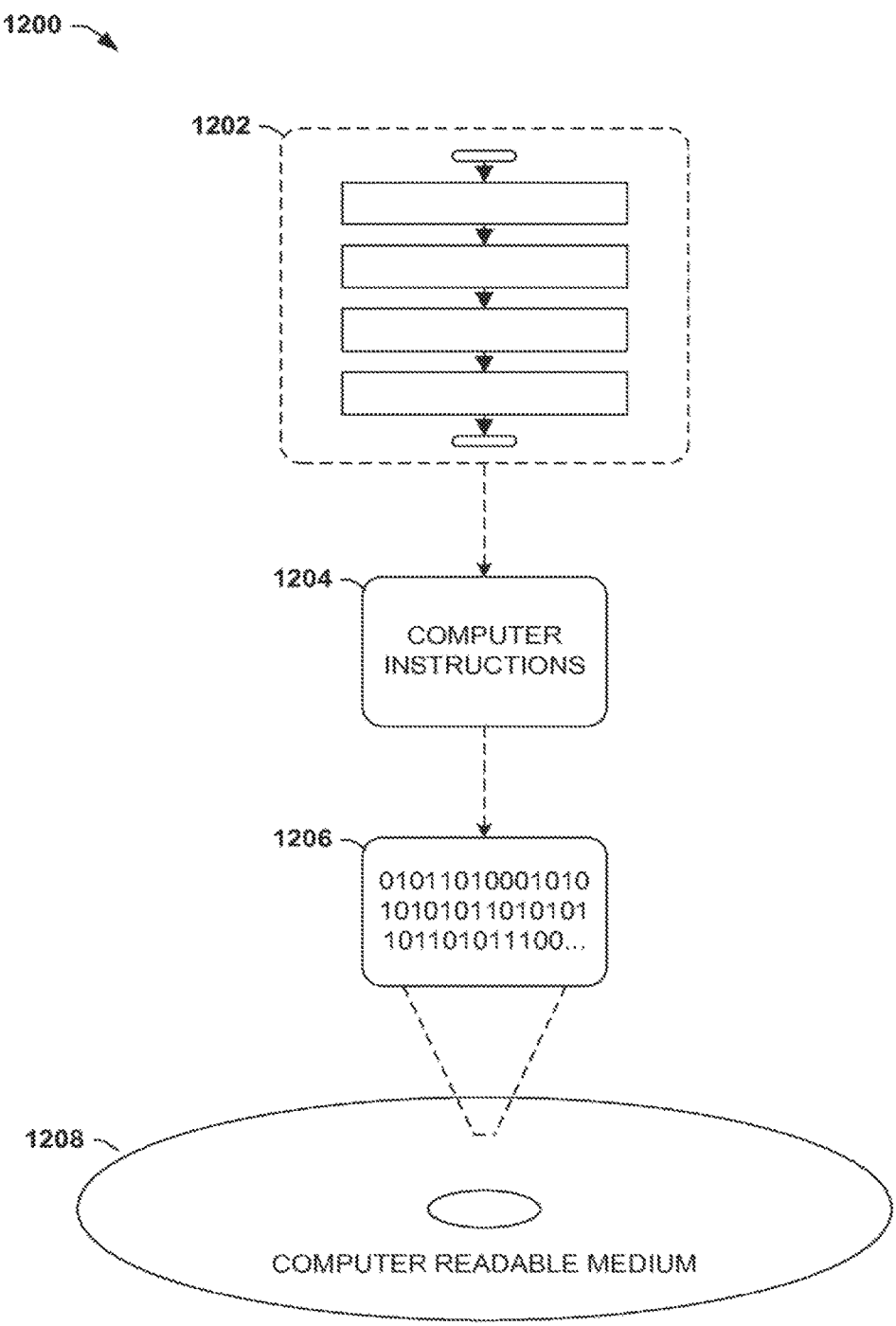
FIG. 12 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 12, wherein the implementation 1200 comprises a computer-readable medium 1208 (e.g., a CD-R, DVD-R, or a platter of a hard disk drive), on which is encoded computer-readable data 1206. This computer-readable data 1206 in turn comprises a set of computer instructions 1204 configured to operate according to one or more of the principles set forth herein. In one such embodiment 1202, the processor-executable instructions 1204 may be configured to perform a method, such as the exemplary method 200 of FIG. 2, for example. In another such embodiment, the processor-executable instructions 1204 may be configured to implement a system, such as the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 13:
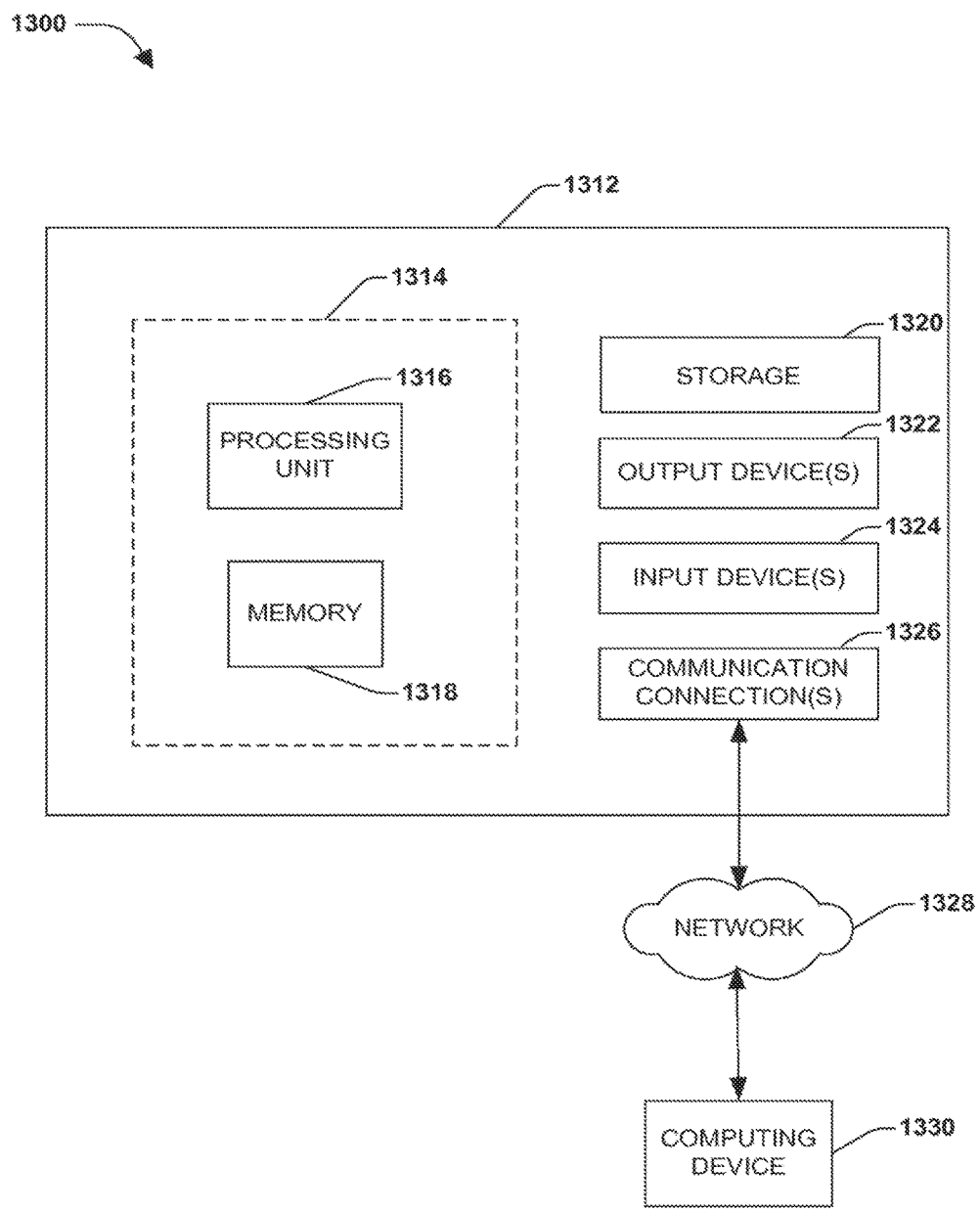
FIG. 13 illustrates an exemplary computing environment wherein one or more of the provisions set forth herein may be implemented.

FIG. 13 and the following discussion provide a brief, general description of a suitable computing environment to implement embodiments of one or more of the provisions set forth herein. The operating environment of FIG. 13 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 13 illustrates an example of a system 1310 comprising a computing device 1312 configured to implement one or more embodiments provided herein. In one configuration, computing device 1312 includes at least one processing unit 1316 and memory 1318. Depending on the exact configuration and type of computing device, memory 1318 may be volatile (such as RAM, for example), non-volatile (such as ROM, flash memory, etc., for example) or some combination of the two. This configuration is illustrated in FIG. 13 by dashed line 1314.

In other embodiments, device 1312 may include additional features and/or functionality. For example, device 1312 may also include additional storage (e.g., removable and/or non-removable) including, but not limited to, magnetic storage, optical storage, and the like. Such additional storage is illustrated in FIG. 13 by storage 1320. In one embodiment, computer readable instructions to implement one or more embodiments provided herein may be in storage 1320. Storage 1320 may also store other computer readable instructions to implement an operating system, an application program, and the like. Computer readable instructions may be loaded in memory 1318 for execution by processing unit 1316, for example.

The term "computer readable media" as used herein includes computer storage media. Computer storage media includes volatile and nonvolatile, removable and non-removable media implemented in any method or technology for storage of information such as computer readable instructions or other data. Memory 1318 and storage 1320 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1312. Any such computer storage media may be part of device 1312.

Device 1312 may also include communication connection(s) 1326 that allows device 1312 to communicate with other devices. Communication connection(s) 1326 may include, but is not limited to, a modem, a Network Interface Card (NIC), an integrated network interface, a radio frequency transmitter/receiver, an infrared port, a USB connection, or other interfaces for connecting computing device 1312 to other computing devices. Communication connection(s) 1326 may include a wired connection or a wireless connection. Communication connection(s) 1326 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1312 may include input device(s) 1324 such as keyboard, mouse, pen, voice input device, touch input device, infrared cameras, video input devices, and/or any other input device. Output device(s) 1322 such as one or more displays, speakers, printers, and/or any other output device may also be included in device 1312. Input device(s)

1324 and output device(s) 1322 may be connected to device 1312 via a wired connection, wireless connection, or any combination thereof. In one embodiment, an input device or an output device from another computing device may be used as input device(s) 1324 or output device(s) 1322 for computing device 1312.

Components of computing device 1312 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1312 may be interconnected by a network. For example, memory 1318 may be comprised of multiple physical memory units located in different physical locations interconnected by a network.

Those skilled in the art will realize that storage devices utilized to store computer readable instructions may be distributed across a network. For example, a computing device 1330 accessible via network 1328 may store computer readable instructions to implement one or more embodiments provided herein. Computing device 1312 may access computing device 1330 and download a part or all of the computer readable instructions for execution. Alternatively, computing device 1312 may download pieces of the computer readable instructions, as needed, or some instructions may be executed at computing device 1312 and some at computing device 1330.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for efficiently organizing images in a display for a computing device, the method comprising:
   scaling a size of a first image by an image scale factor while maintaining an image aspect ratio of the first image, the image scale factor comprising a combination of a first scale distance and a second scale distance;
   after scaling, filling the first image into a first display line;
   after filling the first image into the first display line, determining whether a size of a second image is greater than an amount of display space remaining in the first display line, the first image and the second image being non-uniform,
   when the size of the second image is not greater than the amount of display space remaining in the first display line, then filling the second image into the first display line, and
   when the size of the second image is greater than the amount of display space remaining in the first display line, then filling the second image into a second display line; and
   expanding one or more of the first image and the second image to mitigate white space in the display after scaling, while maintaining the image aspect ratio of the first image and an image aspect ratio of the second image.

2. The method of claim 1, further comprising providing for application of a double touch to a touch-sensitive display in order to generate the first scale distance and the second scale distance.

3. The method of claim 2, further comprising determining the image scale factor, comprising:
   determining a first inter-touch distance of the double touch;
   determining a second inter-touch distance of the double touch; and
   combining the first inter-touch distance and the second inter-touch distance to generate the image scale factor.

4. The method of claim 1, further comprising:
   identifying a central image; and
   maintaining the central image in a display line between endpoints of the second scale distance after scaling.

5. The method of claim 4, wherein identifying the central image comprises selecting an image positioned at or near a center point area of the first scale distance.

6. The method of claim 1, further comprising:
   providing for scrolling the display of images in two opposite directions; and
   maintaining the scrolling provided in the two opposite directions after scaling.

7. The method of claim 6, wherein the first display line comprises:
   a horizontal row if the two opposite directions of scrolling are up and down; and a vertical column if the two opposite directions of scrolling are left and right.

8. The method of claim 1, wherein scaling the size of the first image comprises:
determining a first image display box comprising a combination of the image scale factor and the aspect ratio of the first image, and
resizing the first image to fit inside the first image display box.

9. The method of claim 1, wherein determining whether the size of the second image is greater than the amount of display space remaining in the first display line comprises determining whether a size of a margin between images combined with the size of the second image is greater than the amount of display space remaining in the first display line.

10. The method of claim 9, further comprising increasing the margin between images in a display line when the display line is full to provide a justified appearance for the images in the display line.

11. The method of claim 1, wherein expanding the one or more of the first image and the second image to mitigate white space in the display comprises expanding the one or more of the first image and the second image by an expansion factor while maintaining the image aspect ratio of the first image, the image aspect ratio of the second image, and a margin between images.

12. The method of claim 11, wherein expanding the one or more of the first image and the second image to mitigate white space comprises:
determining a display distance between the second display line (R) and the first display line (R−1); and
shifting one or more images in the second display line toward the first display line by a distance equivalent to a combination of the display distance and the margin.

13. The method of claim 12, wherein determining the display distance comprises iteratively determining an offset value of the second display line (R) given an offset value of the first display line (R−1), for one or more images in each of the first display line and the second display line until a smallest display distance between the first display line and the second display line is determined.

14. The method of claim 1, wherein expanding the one or more of the first image and the second image to mitigate white space comprises expanding the first image in the first display line such that:
the first image and an image in an adjacent display line are coincident in a first axis that is orthogonal to a direction of scrolling the display; and
at least a space equivalent to a margin separates the first image and the image in the adjacent display line along a second axis that is parallel to the direction of the scrolling of the display.

15. A system for efficiently displaying images in a computing environment, comprising:
a display component configured to display images;
a memory component configured to store image data;
a scaling component operably coupled with the memory component and configured to scale a size of a first image using an image scale factor while maintaining an image aspect ratio of the first image, the image scale factor derived from a combination of a first scale distance and a second scale distance;
a display line filling component operably coupled with the image scaling component and the display component, and configured to
fill the first image into a first display line on the display, after filling the first image into the first display line, when a size of a second image is not greater than an amount of display space remaining in the first display line, the first image and the second image being non-uniform, then fill the second image into the first display line, and
after filling the first image into the first display line, when the size of the second image is greater than the amount of display space remaining in the first display line, then fill the second image into a second display line; and
an expansion component operably coupled with the display component and configured to expand one or more of the first image and the second image to mitigate white space on the display after scaling while maintaining the image aspect ratio of the first image and an image aspect ratio of the second image.

16. The system of claim 15, wherein the display component comprises a touch-sensitive display configured to provide for applying a double touch to the display component to generate the first scale distance and the second scale distance.

17. The system of claim 15, further comprising an image centering component configured to:
identify a central image by selecting an image that comprises a center point area of the first scale distance; and
maintain the central image in a display line between endpoints of the second scale distance after scaling.

18. The system of claim 15, further comprising a scrolling component configured to:
provide for scrolling images on the display component in two opposite directions; and
maintain the scrolling in the two opposite directions after scaling, wherein each display line comprises
a horizontal row if the two opposite directions of scrolling are up and down, and
a vertical column if the two opposite directions of scrolling are left and right.

19. The system of claim 15, wherein the expansion component comprises:
an expansion factor determination component configured to calculate an expansion factor that mitigates white space between an image in the first display line and an image in the second display line while maintaining a margin between the image in the first display line and the image in the second display line;
a display line shifting component configured to:
determine a display distance between the second display line (R) and the first display line (R−1), and
shift the image in the second display line toward the first display line by a distance equivalent to a combination of the display distance and the margin; and
a display distance determination component configured to determine the display distance by iteratively determining an offset value of the second display line (R) given an offset value of the first display line (R−1), for the image in the first display line and the image in the second display line until a smallest display distance between the first display line and the second display line is determined.

20. A method for efficiently organizing images in a display for a touch-sensitive computing device, comprising:
providing for application of a double touch to a touch-sensitive display;
determining an image scale factor, comprising:
determining a first inter-touch distance of the double touch,
determining a second inter-touch distance of the double touch, and
combining the first inter-touch distance and the second inter-touch distance to generate the image scale factor;

for each image of a plurality of non-uniform images displayed, scaling a size of the image by the image scale factor while maintaining an image aspect ratio of the image;

after scaling, for each image of the plurality of non-uniform images displayed, filling the image into a first display line if a size of a margin between images combined with the size of the image is not greater than an amount of display space remaining in the first display line, and else filling the image into a second display line;

maintaining a central image in a display line between endpoints of the second inter-touch distance; and expanding one or more images to mitigate white space in the display while maintaining the margin between images and the image aspect ratio for each image expanded.

\* \* \* \* \*